Feb. 22, 1949.   D. CURRIE   2,462,726
TRACTOR HITCH BRACKET
Filed July 3, 1946

INVENTOR.
Dugald Currie
BY
ATTY.

Patented Feb. 22, 1949

2,462,726

UNITED STATES PATENT OFFICE 2,462,726

TRACTOR HITCH BRACKET

Dugald Currie, Des Moines, Iowa, assignor to Donald Currie, Odebolt, Iowa

Application July 3, 1946, Serial No. 681,319

4 Claims. (Cl. 280—33.44)

This invention relates generally to tractor hitches and in particular to a hitch attachment for a tractor provided with what is commonly referred to as the Ferguson system for connecting farm implements with the tractor.

In one form of the Ferguson system a transverse drawbar is generally supported an appreciable distance behind the tractor rear axle housing and between the rear ends of a pair of transversely spaced frame members, the forward ends of which are pivoted on the tractor rear axle. As a result when a farm implement is hitched to the drawbar much difficulty is encountered in making turns at the end of a field, when working in plowed or loose ground, due to the fact that the implement does not closely track behind the tractor. Attempts to overcome this difficulty have not been generally satisfactory and have resulted in hitch attachments which are relatively complicated and difficult to remove from and assemble with the Ferguson system, or in operation provide for the application of pulling forces on parts of this system not intended or designed to carry such forces.

It is an object of this invention, therefore, to provide an improved tractor hitch.

A further object of this invention is to provide a hitch attachment which can be quickly and easily assembled on a tractor provided with the Ferguson system.

A feature of this invention is found in the provision of a hitch attachment in which a pair of brackets are adapted to be permanently assembled at opposite sides of a frame structure extended rearwardly from the tractor. Socket portions on the brackets are adapted to releasably receive therein and hold against relative movement the end portions of a transverse member, which has a hitch bar pivoted intermediate its ends.

Figure 1:
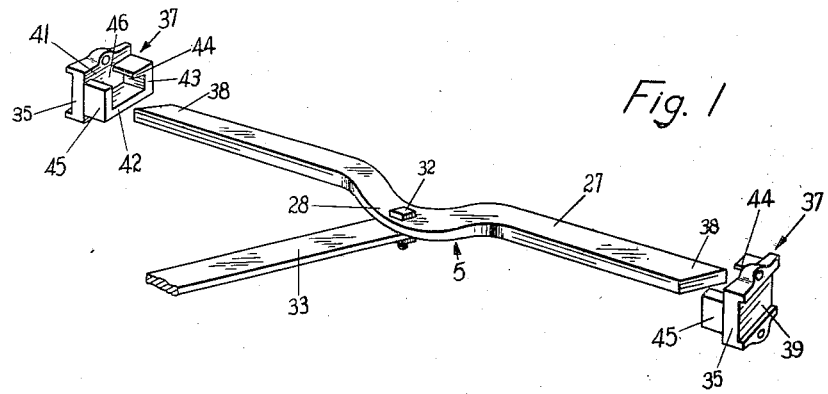
Figure 2:
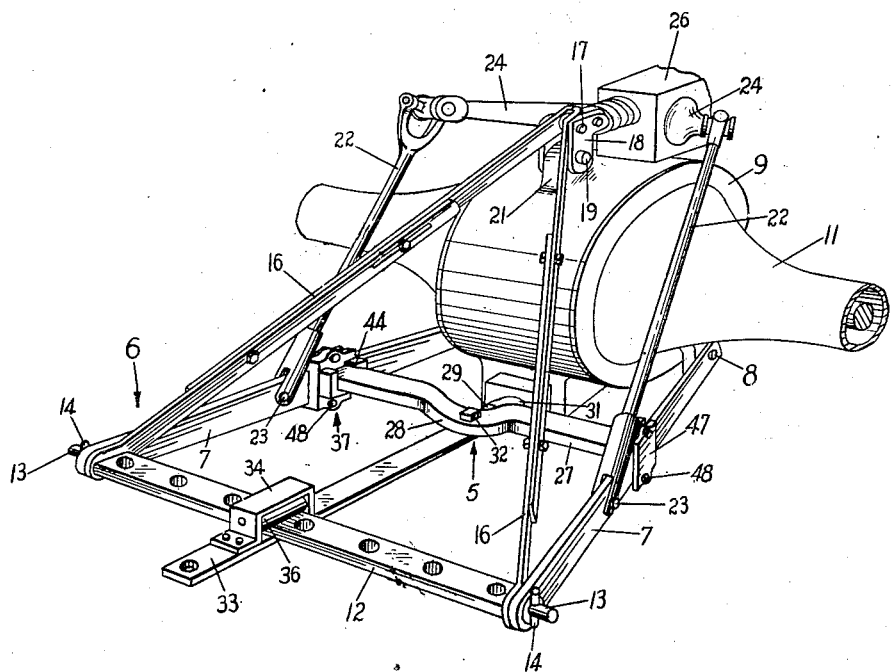

Further objects, features and advantages of this invention will appear from the following description when taken in connection with the accompanying drawings in which:

Fig. 1 is a fragmentary exploded perspective view of the hitch attachment of this invention; and Fig. 2 is a perspective view showing the hitch attachment in assembly relation with the rear end portion of a tractor.

With reference to the drawings the hitch attachment of this invention, indicated generally as 5, is illustrated in Fig. 2 in assembly relation with a frame structure 6 supported on a tractor, and forming part of the usual Ferguson system.

The frame structure 6 comprises a pair of rearwardly extended diverging arms 7 having their front ends pivoted at 8 to opposite sides of a differential housing 9 constituting part of a rear axle housing 11. Connected between the rear ends of the frame members 7 is a drawbar 12 having reduced ends 13 extended through the frame members 7. The drawbar 12 is maintained in an assembly relation with the members 7 by tapered keys 14 projected through the ends 13.

Pivotally connected to opposite ends of the drawbar 12 are a pair of brace bars 16, the forward ends of which are pivoted at 17 to a rack arm 18 which in turn is pivoted at 19 to an upright projection 21 on the differential housing 9. A pair of upright lifting arms 22 have their lower ends pivotally connected at 23 to corresponding ones of the frame members 7, while the upper ends of the lifting arms 22 are operatively connected with crank arms 24 rotatably supported in a portion 26 of the tractor. The crank arms 24 are operatively associated with lifting mechanism (not shown) for raising and lowering the lifting arms 22.

In the use of the hitch attachment 5 of this invention the frame structure 6 is maintained stationary so that the lifting arms 22 constitute upright frame members.

The hitch attachment comprises a transverse member 27, of a substantially rectangular shape in cross section, and formed with a rearwardly curved or bent central section 28 to provide a clearance relation between the member 27 and the usual cap 29 for the tractor power take-off shaft 31. A bolt 32 is extended through the rear end of the curved section 28 and pivotally supports the forward end of a hitch bar 33 at the bottom side of the transverse member 27. An upright inverted U-shaped bracket member 34 carried adjacent the rear end of the hitch bar 33 is adapted to straddle the transverse drawbar 12 and rotatably support a roller 36 in a spaced relation with the top side of the hitch bar 33.

To support the transverse member 27 on the frame structure 6, there is provided a pair of bracket members 37, mountable on the inside of the frame members 7 and adapted to releasably engage and support the end portions 38 of the transverse member 27 in fixed positions on the frame structure. Since each bracket 37 is of a like construction and similarly assembled with an end 38 of the transverse member 27, only one of the brackets will be described in detail.

A bracket 37 is integrally formed with a substantially flat body member 35 having a tapered outer side 39 conforming to the slope of the rearward divergence of a frame member 7, so that when the bracket outer side 39 is positioned against the inner side of a frame member 7, the inner side 41 of the bracket member is in a plane substantially parallel to the longitudinal axis of the tractor. Projected outwardly from the inner side 41 of the body member 35 is a U-shaped member 42 having a leg 43 formed with a rearwardly extended lateral projection 44. The U-shaped member 42, projection 44 and inner side 41 of the body member 35 constitute a socket of a size and shape corresponding substantially to an end portion 38 of the transverse member. Stated otherwise, an end portion 38, in position within the U member 42, is supported on the base of the U member against forward and rearward movement longitudinally of the frame member 7 by the U member legs 43 and 45, against straight upward movement by the projection 44, and against movement in one direction transversely of the frame member 7 by the bracket inner side 41. The free end of the projection 44 is spaced from the inner side of the U member leg 45 a distance to provide for the reception of an end portion 38 within the socket, when such portion 38 is in a sidewise position and inserted in a downward and forward direction through the space or opening 46 at the top of the U member 42.

In the assembly of the hitch attachment 5 with the frame structure 6 the brackets 37 are mounted opposite each other on the frame members 7, and to the inside of the frame members 7, by clamp members 47 arranged on the outer sides of the frame members 7, and bolts 48 extended through aligned openings formed in the opposite ends of the clamping plates 47 and the bracket body members 35. As best appears in Fig. 2, the brackets 37 are positioned forwardly of the upright lift arms 22 of the frame structure 6.

With the brackets 37 mounted on the frame members 7 the ends 38 of the transverse member 27 are received within the U members 42, by inclining the hitch attachment 5 in a downwardly and forwardly direction so that the ends 38 are inserted sidewise within the openings 46 and underneath the projections 44. The hitch attachment, with the ends 38 of the transverse member 27 within the U members 42, is then lowered into a substantially horizontal plane so that the hitch bar 33 rests on the top side of the drawbar 12.

One of the pins 14 is then removed from the drawbar 12 and the frame member 7 corresponding to such pin is sprung a distance away from the corresponding end 13 of the drawbar 12 a distance sufficient to receive the bracket member 34 therethrough. The free end 13 of the drawbar 12 is then inserted within the bracket 34 between the hitch bar 33 and the roller 36. The sprung frame member 7 is then reassembled with the free end of the drawbar 12. The rear end of the hitch bar 33 is thus movably supported, through the roller 36, for swinging movement longitudinally of the drawbar 12 concurrently with being maintained in a plane substantially parallel with the plane of the drawbar.

With the movable support of the rear end of the hitch bar 33 on the drawbar 12 the hitch attachment 5, including the drawbar 33 and the transverse member 27, is held against any upward and forward tilting movement such as would incline the transverse member 27 to a position providing for the release of the ends 38 thereof from the U members 42 through the openings 46. As a result the ends 38 are held by the projections 44 against upward movement out of their corresponding sockets, while the legs 43 and 45 of the U members 42 limit the movement of the transverse member ends 38 in opposite directions longitudinally of the frame members 7. It is apparent, of course, that the transverse member 27 is maintained against movement transversely of the frame structure 6 by the engagement of its ends 38 with the inner sides 41 of the bracket body members 35.

It is seen, therefore, that the hitch bar is pivotally supported for swinging movement at a position adjacent the rear side of the axle housing 11 and forwardly of the drawbar 12. By virtue of this pivotal support of the hitch bar any farm implement connected therewith is capable of a proper tracking with the tractor when sharp or close turns are to be negotiated. It is also apparent that to assemble the hitch attachment 5 with the frame structure 6 it is only necessary to remove a single pin 14 to permit the insertion of the drawbar 12 within the bracket member 34 and that the removed pin is immediately replaced on completion of this assembly. A complete assembly can be accomplished in the matter of a few minutes without the requirement for bolts or nuts which might be lost or readily misplaced. It is also to be noted that after an initial clamping of the bracket members 37 on the frame members 7, that these brackets may be left permanently attached on the frame members 7 without interfering in any way with a normal operation of the Ferguson system of which the frame structure 6 forms a part.

Further the support of the ends 38 of the transverse member 27 within the sockets on the bracket members 37 provides for the pulling force on the hitch bar 33 being applied to the rear legs 45 of the U members 42, and then through the frame member 7 to the rear axle housing 11, which members are easily capable of safely carrying this pulling force.

From a consideration of the above description, therefore, it is seen that the invention provides a hitch attachment for tractors which is of a simple and inexpensive construction, easily and quickly attachable with the tractor with a minimum of effort and time, capable of providing for a proper tracking of a farm implement with a tractor, and adapted to be connected with a tractor rear axle housing through a pair of rearwardly extended frame members.

Although the invention has been described with respect to a preferred embodiment thereof it is to be understood that it is not to be so limited since modifications and changes can be made therein which are within the full intended scope of this invention as defined by the appended claims.

I claim:

1. A hitch attachment for a tractor having an axle housing, a frame structure supported on the tractor including a pair of transversely spaced rearwardly extended frame members connected at their forward ends with said axle housing, and a drawbar connected between the rear ends of said frame members, said attachment comprising a pair of oppositely arranged brackets mounted on said frame members, socket portions on said brackets located inwardly of said frame members, a transverse member having its ends receivable in supported positions within said socket portions, and against longitudinal movement relative to said frame members, a hitch bar pivoted at its forward end on said transverse member for pivotal movement between said frame members, and means movably supporting said hitch bar adjacent its rear end on said drawbar.

2. A hitch attachment for a tractor comprising a transverse frame member having end portions of a substantially rectangular shape in cross section, a pair of mountable bracket members for supporting said end portions, with each of said bracket members having socket portions corresponding substantially in size and shape to said end portions, with said socket portions having entrance openings for receiving said end portions sidewise therethrough, pivot means extended through said transverse member with its axis normal to the wider sides of said end portions, and a hitch bar pivoted at one end on said pivot means.

3. A hitch attachment for a tractor having an axle housing, a frame structure supported on the tractor including a pair of transversely spaced rearwardly extended frame members connected at their forward ends with said axle housing, and a drawbar connected between the rear ends of said frame members, said attachment comprising a pair of brackets mounted opposite each other on said frame members, and having flat body portions adapted to be positioned against the inner sides of said frame members, inwardly extended upright U-shape portions on said body portions, with one of the legs on said U portions having projections adjacent their free ends extended toward the other one of said legs, a transverse member having end portions of a substantially rectangular shape in cross section receivable sidewise between the legs of said U-portions, and movable within said U portions so that a wide side thereof is supported on the base of the U portions, whereby said projections retain said end portions against straight upward movement out of said U portions and said legs limit the movement of said end portions longitudinally of said frame members, a hitch bar pivoted at its forward end on said transverse member for pivotal movement between said frame members, and means movably supporting said hitch bar adjacent its rear end on said drawbar.

4. A hitch attachment for a tractor having an axle housing, a frame structure supported on the tractor including a pair of transversely spaced rearwardly extended frame members connected at their forward ends with said axle housing, and a drawbar connected between the rear ends of said frame members, said attachment comprising a pair of brackets mounted oppositely from each other on said frame members and having inwardly extended lateral projections, means for releasably locking the ends of said transverse member in supported positions on said projections against upward movement and movement longitudinally and transversely of said frame members, a hitch bar pivoted at its forward end on said transverse member for pivotal movement between said frame member, and means movably supporting the hitch bar adjacent its rear end on said drawbar.

DUGALD CURRIE.

REFERENCES CITED

The following references are of record in the file of this patent:

UNITED STATES PATENTS

| Number | Name | Date |
| --- | --- | --- |
| 1,715,682 | Starks | June 4, 1929 |
| 2,392,903 | Currie | Jan. 15, 1946 |